US010175427B2

United States Patent
Cloud et al.

(10) Patent No.: US 10,175,427 B2
(45) Date of Patent: Jan. 8, 2019

(54) LOW DEBRIS DUST CAP FOR MPO CONNECTORS

(71) Applicant: US Conec, Ltd, Hickory, NC (US)

(72) Inventors: Mitchell Cloud, Matthews, NC (US); Jason Higley, Hickory, NC (US); Darrell R. Childers, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

(21) Appl. No.: 15/947,794

(22) Filed: Apr. 7, 2018

(65) Prior Publication Data

US 2018/0292613 A1  Oct. 11, 2018

Related U.S. Application Data

(60) Provisional application No. 62/482,757, filed on Apr. 7, 2017.

(51) Int. Cl.
  *G02B 6/38* (2006.01)
(52) U.S. Cl.
  CPC ........... *G02B 6/3849* (2013.01); *G02B 6/387* (2013.01); *G02B 6/3885* (2013.01)

(58) Field of Classification Search
  CPC ..... G02B 6/3849; G02B 6/387; G02B 6/3885
  USPC ...................................... 385/53, 75–83, 139
  See application file for complete search history.

(56) References Cited

U.S. PATENT DOCUMENTS

| 8,262,294 B2 | 9/2012 | Marcouiller et al. |
| 2011/0188813 A1* | 8/2011 | Marcouiller ......... G02B 6/3849 385/78 |
| 2018/0095226 A1 | 4/2018 | Watanabe |
| 2018/0210154 A1 | 7/2018 | Jong |

FOREIGN PATENT DOCUMENTS

WO  2018119140 A1  6/2018

* cited by examiner

*Primary Examiner* — Michael Mooney
(74) *Attorney, Agent, or Firm* — Michael L. Leetzow, P.A.; Shubhrangshu Sengupta

(57) ABSTRACT

A low debris dust cap has a plurality of portions corresponding the fiber optic connector on which it is installed. Two latches extending from side walls are disposed between the inner and outer housings. The low debris dust cap can be placed and removed from the connector without movement of either the inner or outer housings.

16 Claims, 8 Drawing Sheets

LOW DEBRIS DUST CAP FOR MPO CONNECTORS

REFERENCE TO RELATED CASE

This application claims priority under 35 U.S.C. § 119 (e) to provisional application No. 62/482,757 filed on Apr. 7, 2017, the contents of which are hereby incorporated by reference in their entirety.

BACKGROUND OF THE INVENTION

Fiber optic connectors essentially require that they have a dust cap placed over the end thereof to prevent dust from accumulating on the end face of the fiber optic ferrule. The dust caps also prevent damage to the end face as well. Material deposited on and damage to the front end of the fiber optic connector can interfere with the operation of the fiber optic connector and may even cause the fiber optic connector to be replaced. Some of the current elastomeric dust cap designs, such as in U.S. Pat. No. 8,262,294, require that the dust cap is locked on the fiber optic connector by outer sleeve. However, moving the inner and outer sleeves may also cause debris. There are also other dust caps that depend on the interference fit to seal around the connector housing, but do not seal around the ferrule. The elastomeric caps tend to collect debris and generate debris when they are installed and removed from the fiber optic connectors. These dust caps are typically made from thermoplastic elastomers because the material is relatively inexpensive. Unlike many thermoset elastomers, thermoplastic elastomers tend to outgas materials over time. The outgassed materials can also cause contamination on the fiber optic ferrule.

Thus, Applicant has identified that a dust cap for a fiber optic connector is needed that prevents the accumulation of dust on the end faces and does not require that the inner and outer housings be moved so as to further reduce the contamination possibilities. The new dust cap is also made from non out-gassing materials.

SUMMARY OF THE INVENTION

The present invention is directed to a low debris dust cap for a fiber optic connector that includes a sleeve extending lengthwise between opposed front and rear ends, said sleeve defining a lengthwise extending opening that opens through the rear end for receiving at least a portion of the fiber optic connector, at least two latches extending from an inside surface of the sleeve, each of the at least two latches extending toward the rear end of the sleeve from a side portion of the inside surface of the sleeve, the inside surface of the sleeve and the at least two latches forming a space therebetween, and at least one portion of the inside surface having a configuration that corresponds to a portion of the fiber optic connector.

In some other embodiments, at least one portion of the inside surface comprises at least three portions, each of the at least three portions having configuration that corresponds to a different portion of the fiber optic connector.

In another embodiment, the at least two latches have a terminal end, the terminal end disposed between an inner housing of the fiber optic connector and an outer housing of the fiber optic connector when the fiber optic connector is inserted into the lengthwise extending opening.

According to another aspect of the present invention, there is a low debris dust cap for a fiber optic connector having a ferrule, an inner housing, and an outer housing, that includes a sleeve extending lengthwise between opposed front and rear ends and having an outside surface and an inside surface, a lengthwise extending opening defined by the inside surface, the lengthwise extending opening opening through the rear end for receiving at least a portion of the fiber optic connector, the lengthwise extending opening having a front portion, a middle portion and a rear portion, the front portion corresponds to a ferrule, the middle portion corresponds to an inner housing and the rear portion corresponds to an outer housing, at least two latches extending from an inside surface of the sleeve, each of the at least two latches extending toward the rear end of the sleeve from a side portion of the inside surface of the sleeve, the inside surface of the sleeve and the at least two latches forming a space therebetween.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
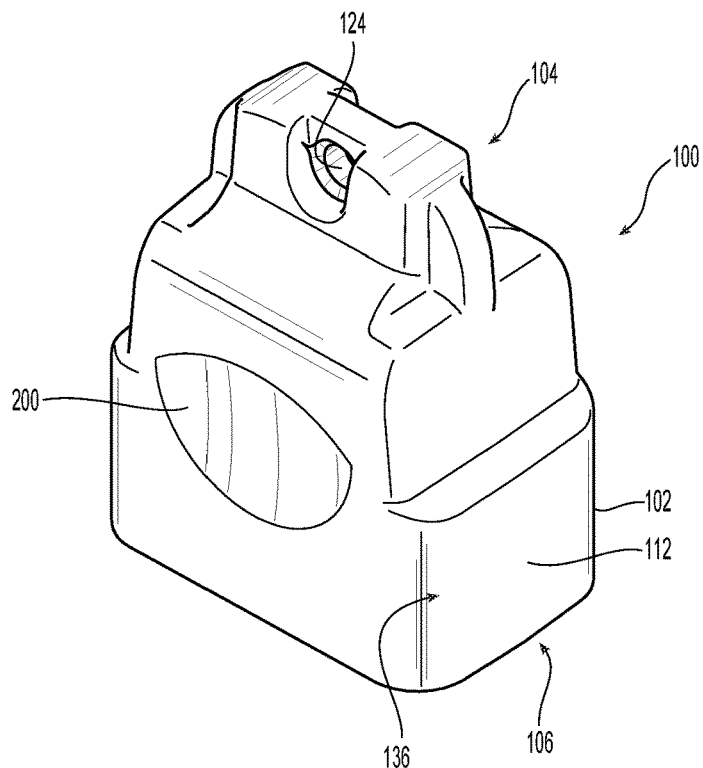
FIG. 1 is a front perspective view of one embodiment of a low debris dust cap according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 5:
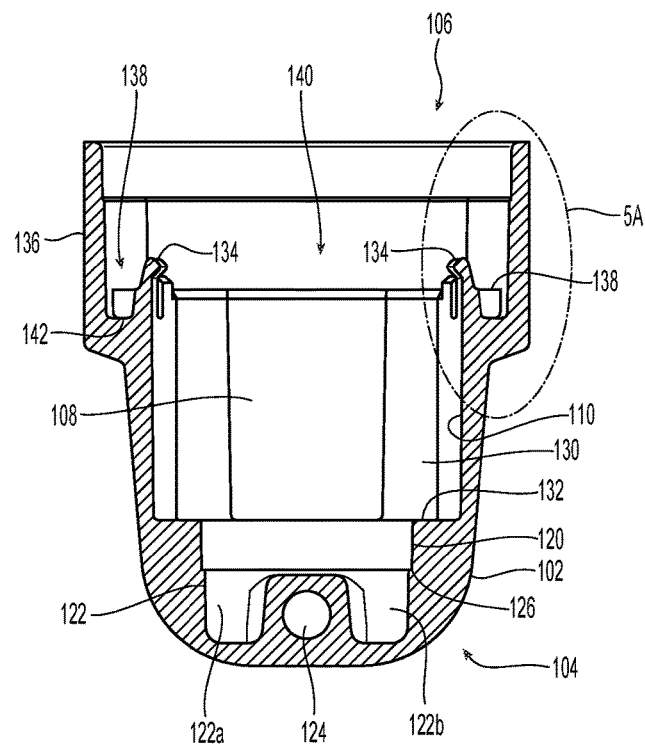
FIG. 5 is a cross section of low debris dust cap of FIG. 3 along the line 5-5.
Figure 6:
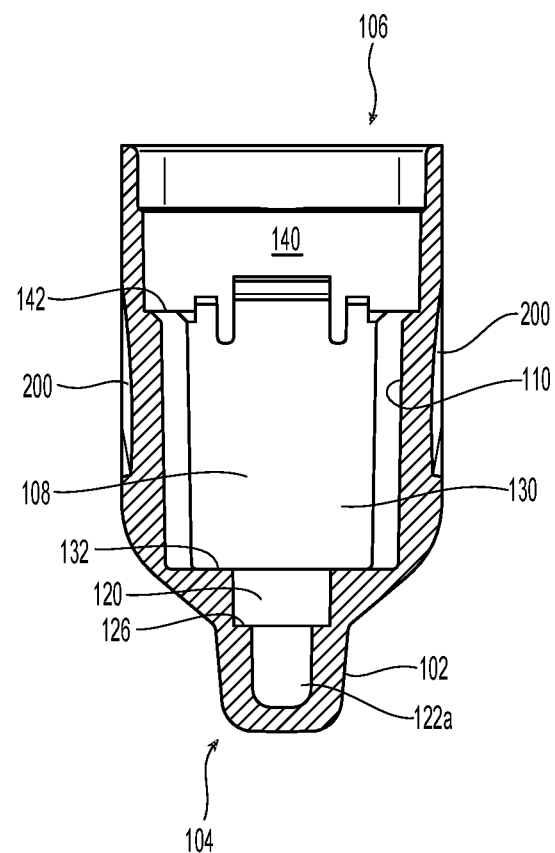
FIG. 6 is a cross section of low debris dust cap of FIG. 3 along the line 6-6.
Figure 7:
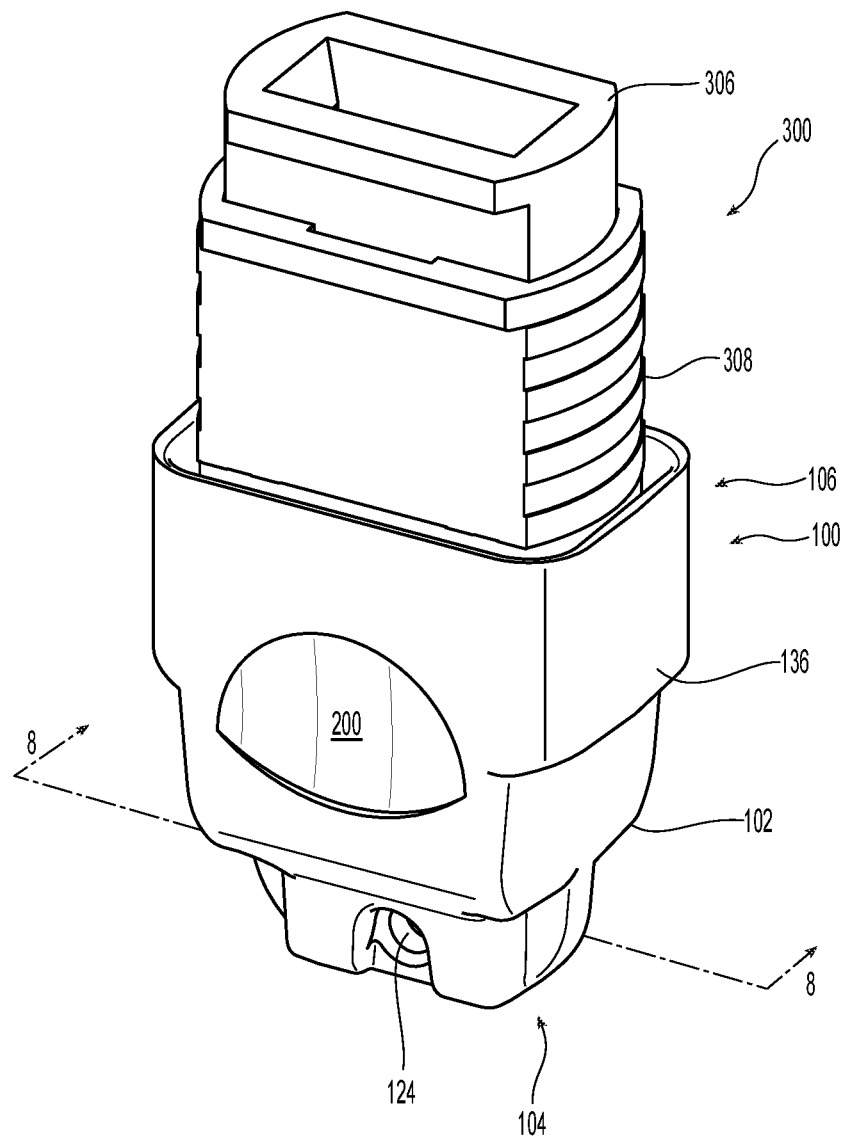
FIG. 7 is a perspective view of the low debris dust cap in FIG. 1 with parts of an MPO style connector inserted therein, the parts including an inner and outer housing and a ferrule.

FIGS. 1-9 illustrate one embodiment of a low debris dust cap 100 for a fiber optic connector 300 (see FIG. 7). The low debris dust cap 100 includes a sleeve 102 extending lengthwise between opposed front end 104 and rear end 106. The sleeve 102 defines a lengthwise extending opening 108 that opens through the rear end 106 for receiving at least a portion of the fiber optic connector 300. The lengthwise extending opening 108 is formed by an inside surface 110. The sleeve 102 also has an outer surface 112. The inside surface 110 may be divided into multiple portions. In the embodiment illustrated, the inside surface 110 is preferably divided into three portions although it may be fewer or more. The first or front portion 120 corresponds to a fiber optic ferrule. As can be seen in FIGS. 4-6, 8, and 10, the configuration of the front portion 120 closely follows the outer surface of the fiber optic ferrule 302 that is present in the fiber optic connector 300. While the front portion 120 is very close to the fiber optic ferrule 302, it is not designed to engage or exactly match the configuration of the fiber optic ferrule 302. As such, there is a little bit of clearance between the low debris dust cap 100 and the fiber optic ferrule 302 as will be explained in more detail below.

As used herein, the term "front" and "forward" means that direction where the fiber optic connector would mate with another fiber optic connector or, as in the present direction, the direction that fiber optic connector is inserted into the low debris dust cap. The term "rear" or "rearward" is used to mean the direction from which the fiber optic connector and/or optical fibers enter into the fiber optic ferrule. So turning to FIG. 4, the front of the low debris dust cap is the direction shown by the arrow labeled "FRONT" and "back" or "rearward" is the opposite direction. Thus, rearward is coming out of the low debris dust cap toward the reader in FIG. 2.

Figure 8:
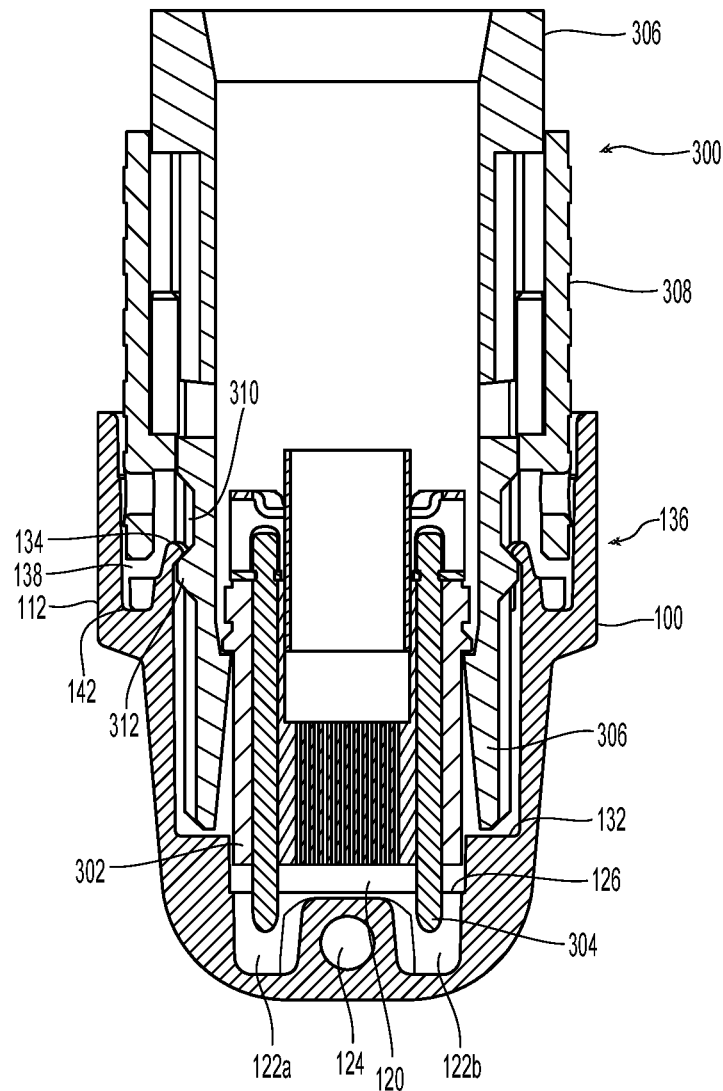
FIG. 8 is a cross section of the low debris dust cap of FIG. 7 along the line 8-8.

The front portion 120 may also be in communication with an area 122 forward of the front portion 120 to receive guide pins 304 that extend from the fiber optic ferrule 302 (see FIGS. 2, 3, 6, and 8). The area 122 is divided into two separate guide pin portions 122a and 122b, each of the guide pin portions 122a,122b receiving one of the guide pins 304. As illustrated in FIG. 5, an opening 124 between the guide pin portions 122a,122b allows for the low debris dust cap 100 to be attached to a lanyard or other pulling device. FIG. 8 illustrates the positioning of the guide pins 304 in the guide pin portions 122a,122b and also the opening 124 therebetween. It is also contemplated that the opening could be more forward of the guide pin portions 122a,122b and not require the two guide pin portions but only a single portion or simply an extension of the forward portion 120.

Figure 2:
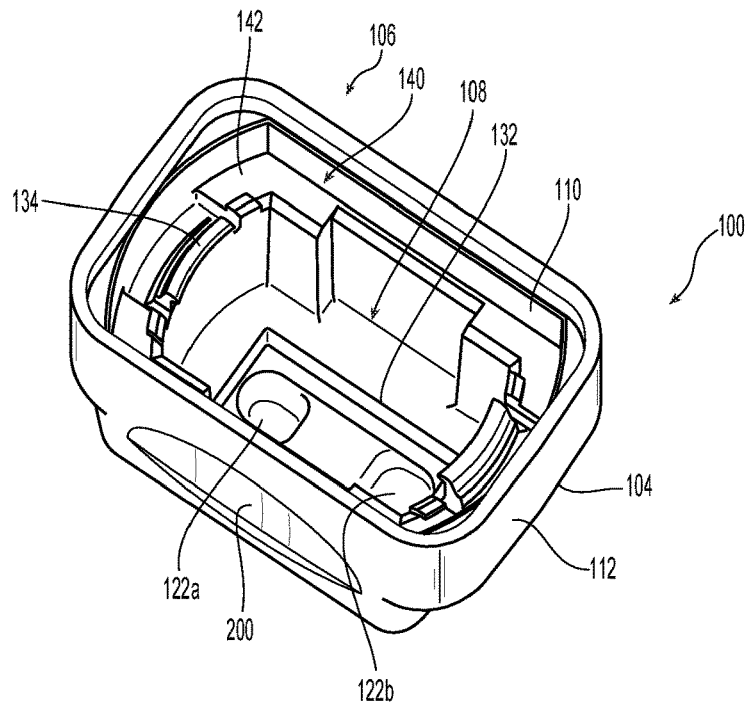
FIG. 2 is a rear perspective view of the front end of the low debris dust cap of FIG. 1.
Figure 3:
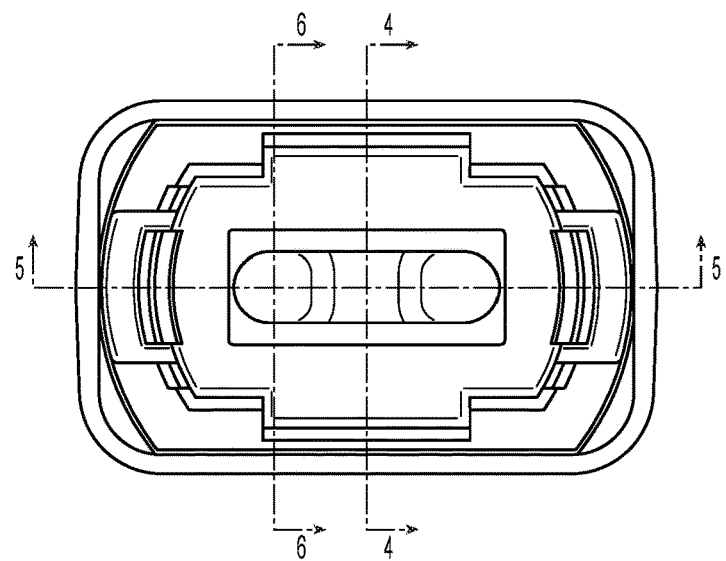
FIG. 3 is a plan view of the low debris dust cap from the rear end.
Figure 4:
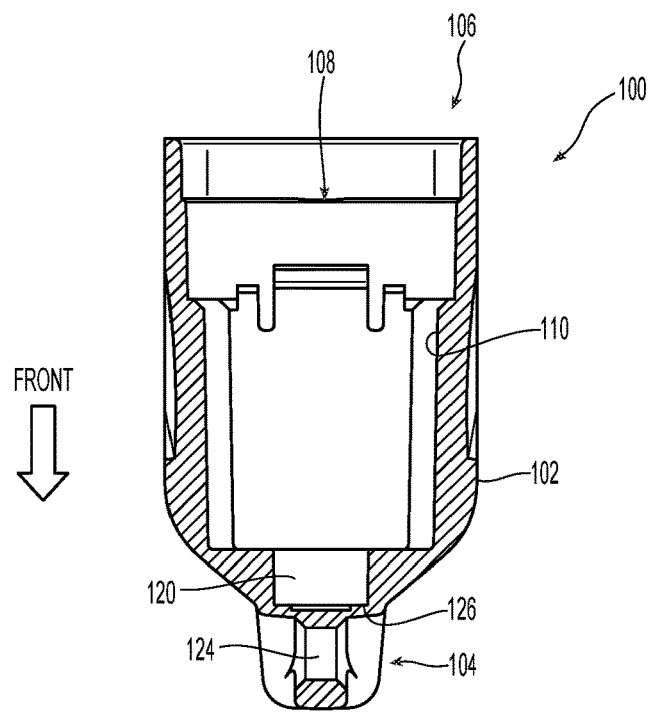
FIG. 4 is a cross section of low debris dust cap of FIG. 3 along the line 4-4.

As best illustrated in FIGS. 2, 5, and 8, there is a shoulder 126 between the front portion 120 and the area 122 which may prevent the fiber optic ferrule 302 and the fiber optic connector 300 from moving too far forward in the low debris dust cap 100. The shoulder 126 may be a rear facing surface as illustrated in FIG. 6. The shoulder 126 also causes a more circuitous route from the rear portion of the low debris dust cap 100 to the front portion 120. This circuitous route assists in reducing the amount of dust and debris that finds it way to the front face of the fiber optic ferrule 302.

A second or middle portion 130 is rearward of the first or front portion 120 and corresponds to the inner housing 306 of the fiber optic connector 300. The middle portion 130 is larger in cross section than front portion 120. Additionally, there is a shoulder 132 between the middle portion 130 and the front portion 120, which may also be in the form of a rear facing surface. See FIG. 6. This shoulder 132 may also be used to prevent the fiber optic connector 300 from entering too far and provides another blockage to dust that may otherwise get to the front face of the fiber optic ferrule 302.

Figure 5A:
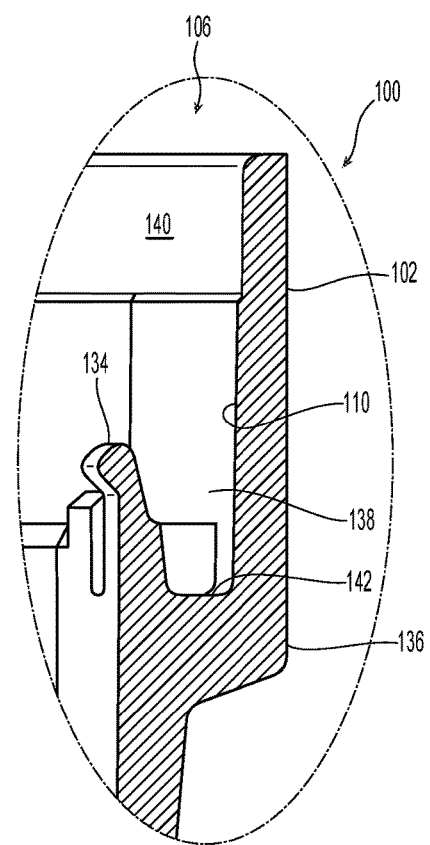
FIG. 5A is an enlarged portion of the low debris dust cap in FIG. 5.

Additionally, the middle portion 130 has at least two latches 134 extending from the inside surface 110 of the sleeve 102, each of the at least two latches 134 extending toward the rear end 106 of the sleeve from a side portion 136 of the inside surface 110 of the sleeve 102. As seen in FIGS. 5 and 5A, the latches 134 are slightly curved and extend not only rearwardly, but into the lengthwise extending opening 108 and towards one another.

Adjacent the latches 134 and rearwardly from the middle portion 130 is a third or rear portion 140. The rear portion 140 corresponds to the outer housing 308 of the fiber optic connector 300. See, e.g., FIGS. 4, 5, and 8. The sleeve 102 becomes larger at the rear portion 140 to accommodate the outer housing 308 of the fiber optic connector 300 causing a bit of a flare out 136 of the outer surface 112. The rear portion 140 is, larger in cross section that the middle portion 130 to accommodate the larger outer housing 308. Similar to the other transitional portions, there is a shoulder 142 between the middle portion 130 and rear portion 140. Again, the shoulder 142 may be a rearward facing surface to impede the travel of dust and debris to the front face of the fiber optic ferrule 302. In this case, the shoulder 142 along the sides of the sleeve 102 is between the latches 134 and the inside surface 110. The inside surface 110 of the sleeve 102 and the latches 134 form a space 138 (at the shoulder 142) therebetween to receive a portion of the outer housing 308 of the fiber optic connector 300. See FIGS. 8, 9, and 9A.

The low debris dust cap 100 is preferably made with a dissipative, halogen-free, non-outgassing material. There are a number of available polymer resins with a dissipative filler could be used, examples include polycarbonate and ABS. The low debris dust cap 100 may also have a depression 200 on at least one surface to provide a gripping feature to assist in handing the low debris dust cap 100. The depression 200 may also be a raised surface that also provides a gripping feature.

Figure 9:
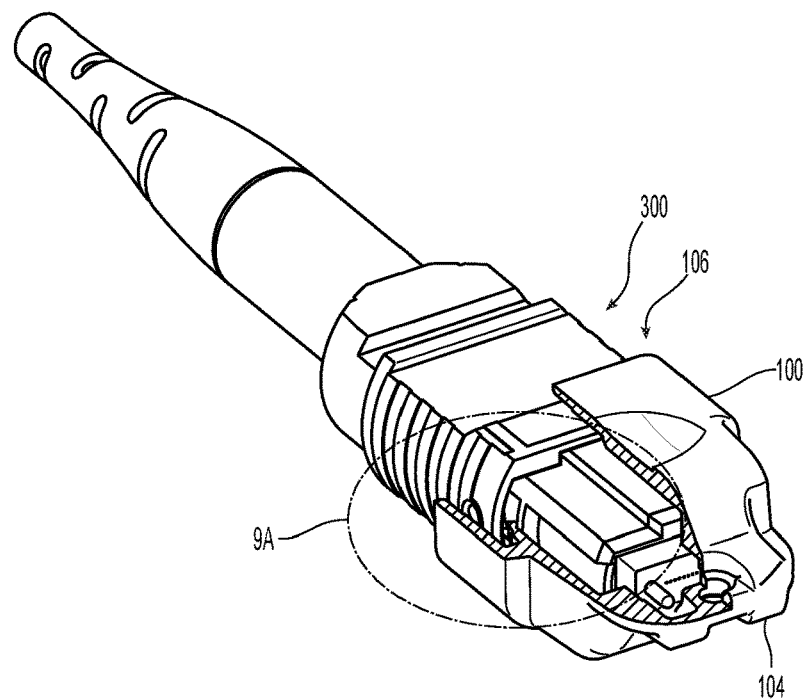
FIG. 9 is a partial cross section in a perspective view of the low debris dust cap of with parts of an MPO style connector in FIG. 8.
Figure 9A:
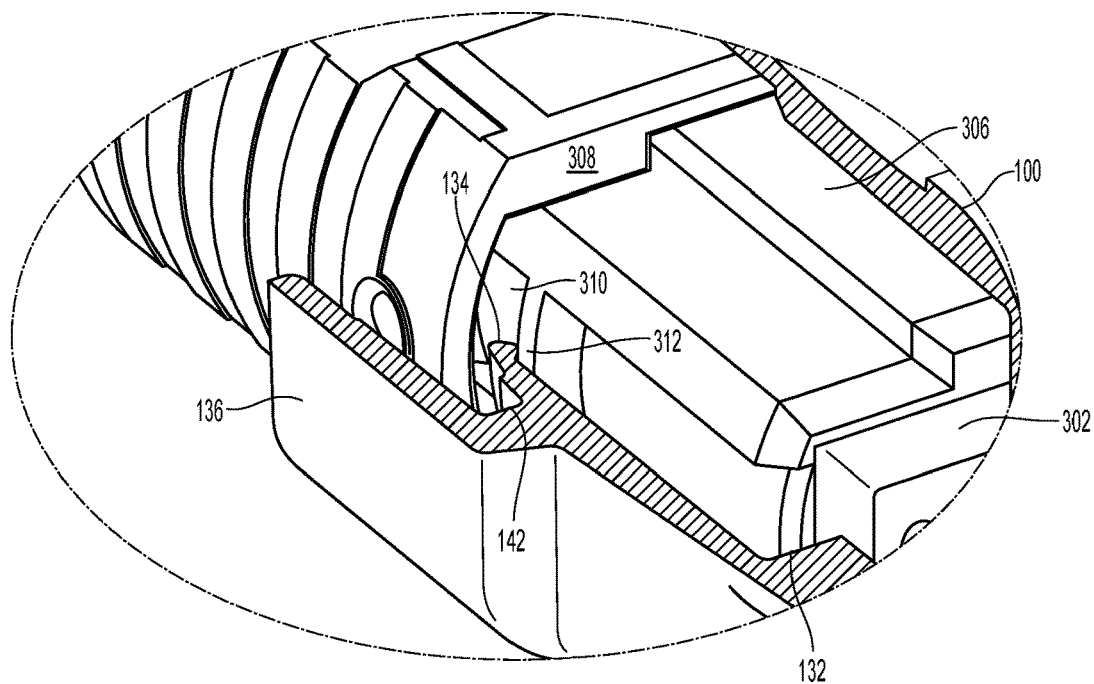
FIG. 9A is an enlarged portion of the low debris dust cap with parts of an MPO style connector in FIG. 9.
Figure 10:
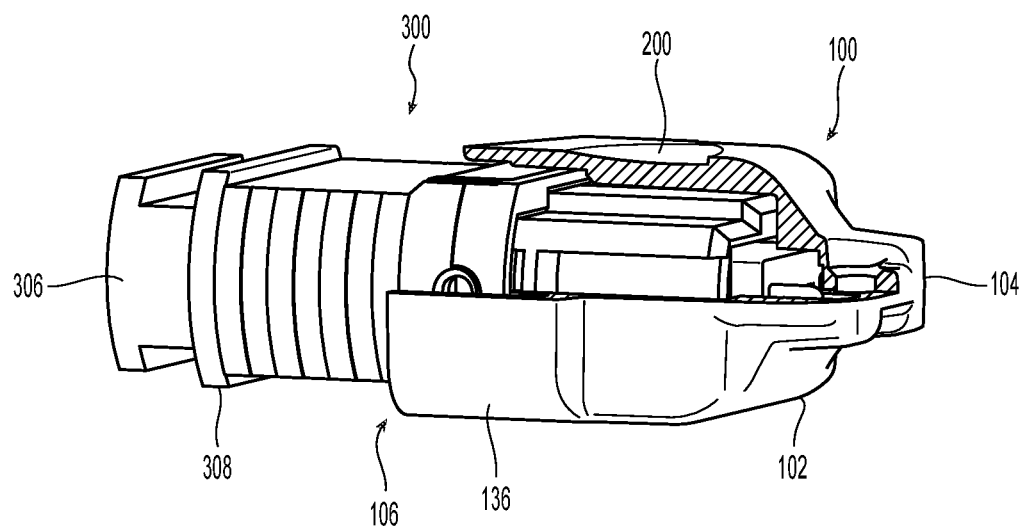
FIG. 10 is a perspective view from the side of the low debris dust cap and MPO style connector in FIG. 8.

Turning now to FIGS. 8, 9 and 9A, the interaction of the at least two latches 134 with the inner housing 306 and the outer housing 308 will be explained. The inner housing 306 has at least one indentation 310 on the sides, the at least one indentation being rearward of a rib 312. (and may be even around the circumference thereof). The at least two latches 134 are designed to pass over the rib 312 on the inner sleeve 306 and into the indentation 310. There should be float between the at least two latches 134 and the inner housing 306. The at least two latches 134 should not elastically engaged with the rib 312 or any other portion of the inner housing 306. Rather, the at least two latches 134 should extend around the rib 312 and into the indentation 310 behind the rib 312. Thus, the inside surface 110 will engage a portion of the fiber optic connector 300. This also means that there will be some float of the low debris dust cap 100 while disposed on the fiber optic connector 300.

To remove or install the low debris dust cap 100 on the fiber optic connector 300, a technician or other operator may simply pull on or push the low debris dust cap 100 while holding any portion of the fiber optic connector 300. The inner and outer housings do not need to move to remove the low debris dust cap 100.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A low debris dust cap for a fiber optic connector comprising:
   a sleeve extending lengthwise between opposed front and rear ends, said sleeve defining a lengthwise extending opening that opens through the rear end for receiving at least a portion of the fiber optic connector;
   at least two latches extending from an inside surface of the sleeve, each of the at least two latches extending toward the rear end of the sleeve from a side portion of the inside surface of the sleeve, the inside surface of the sleeve and the at least two latches forming a space therebetween; and
   the inside surface comprises at least three portions, the at least three portions comprise a front portion, a middle portion and a rear portion and each of the at least three portions have a circumference, the circumference of each of the at least three portions being different from each of the other of the at least three portions.

2. The low debris dust cap according to claim 1, wherein each of the at least two latches have a terminal end, the terminal end extending into the lengthwise extending opening and disposed within a recess of an inner housing of the fiber optic connector when inserted therein.

3. The low debris dust cap according to claim 1, wherein the front portion corresponds to a ferrule, the middle portion corresponds to an inner housing, and the rear portion corresponds to an outer housing.

4. The low debris dust cap according to claim 1, wherein the at least two latches have a terminal end, the terminal end disposed between an inner housing of the fiber optic connector and an outer housing of the fiber optic connector when the fiber optic connector is inserted into the lengthwise extending opening.

5. The low debris dust cap according to claim 1, further comprising a lanyard opening at the front end thereof.

6. The low debris dust cap according to claim 1, the sleeve having an outside surface, the outside surface having a gripping feature therein to assist in removing the dust cap.

7. The low debris dust cap according to claim 1, wherein the inside surface comprises a first rearward facing surface between the front and middle portions and a second rearward facing surface between the middle and rear portions.

8. The low debris dust cap according to claim 4, wherein the terminal ends are disposed between and removed from between the inner housing and the outer housing without relative movement of the inner housing and the outer housing.

9. A low debris dust cap for a fiber optic connector having a ferrule, an inner housing, and an outer housing, comprising:
   a sleeve extending lengthwise between opposed front and rear ends and having an outside surface and an inside surface;
   a lengthwise extending opening defined by the inside surface, the lengthwise extending opening opening through the rear end for receiving at least a portion of the fiber optic connector, the lengthwise extending opening having a front portion with a first circumference and corresponding to a ferrule, a middle portion having a second circumference and corresponding to an inner housing, and a rear portion having a third circumference and corresponding to an outer housing, the circumference of each of the portions being different from each of the other portions; and
   at least two latches extending from an inside surface of the sleeve, each of the at least two latches extending toward the rear end of the sleeve from a side portion of the inside surface of the sleeve, the inside surface of the sleeve and the at least two latches forming a space therebetween.

10. The low debris dust cap according to claim 9, where the at least two latches have a terminal end, each of the terminal ends are disposed between an inner housing of fiber optic connector and an outer housing of the fiber optic connector when the fiber optic connector is inserted into the lengthwise extending opening.

11. The low debris dust cap according to claim 10, wherein the terminal ends are disposed and removed from between the inner housing and the outer housing without relative movement of the inner housing and the outer housing.

12. The low debris dust cap according to claim 9, where the at least two latches have a terminal end, the terminal end extending into the lengthwise extending opening and disposed within a recess of an inner housing of the fiber optic connector when inserted therein.

13. The low debris dust cap according to claim 9, further comprising a lanyard opening at the front end thereof.

14. The low debris dust cap according to claim 9, the outside surface having a gripping feature therein to assist in removing the dust cap.

15. The low debris dust cap according to claim 14, wherein the gripping feature is a depression.

16. A low debris dust cap for a fiber optic connector comprising:
   a sleeve extending lengthwise between opposed front and rear ends, said sleeve defining a lengthwise extending opening that opens through the rear end for receiving at least a portion of the fiber optic connector;
   at least two latches extending from an inside surface of the sleeve, each of the at least two latches extending toward the rear end of the sleeve from a side portion of the inside surface of the sleeve, the inside surface of the sleeve and the at least two latches forming a space therebetween; and
   at least one portion of the inside surface having a configuration that corresponds to a portion of the fiber optic connector,
   wherein the at least two latches have a terminal end, the terminal end disposed and removed from between an inner housing of the fiber optic connector and an outer housing of the fiber optic connector without relative movement of the inner housing and the outer housing.

* * * * *